United States Patent
Kruse

[11] Patent Number: 6,156,278
[45] Date of Patent: *Dec. 5, 2000

[54] CATALYTIC CONVERTER CONFIGURATION AND EXHAUST GAS SYSTEM WITH A CATALYTIC CONVERTER CONFIGURATION

[75] Inventor: Carsten Kruse, Lohmar, Germany

[73] Assignee: Emitec Gesellschaft fuer Emissionstechnologie mbH, Lohmar, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/999,322

[22] Filed: Dec. 29, 1997

[30] Foreign Application Priority Data

Dec. 27, 1996 [DE] Germany .............................. 196545412

[51] Int. Cl.⁷ ................................... B01D 53/34
[52] U.S. Cl. ......................... 422/180; 422/177; 422/222; 60/324
[58] Field of Search .................................... 422/177, 180, 422/181, 171, 211, 222, 174; 60/299, 302, 323, 324

[56] References Cited

U.S. PATENT DOCUMENTS

| | | | |
|---|---|---|---|
| 4,261,170 | 4/1981 | Suzuki ..................................... | 422/180 |
| 4,741,082 | 5/1988 | Kanniainen et al. .................... | 422/180 |
| 4,803,189 | 2/1989 | Swars ...................................... | 502/439 |
| 5,365,735 | 11/1994 | Weber et al. .............................. | 60/324 |
| 5,464,679 | 11/1995 | Maus et al. .............................. | 428/116 |

*Primary Examiner*—Hien Tran
*Attorney, Agent, or Firm*—Herbert L. Lerner; Laurence A. Greenberg; Werner H. Stemer

[57] ABSTRACT

A catalytic converter configuration for an exhaust gas system of a motor vehicle having an internal combustion engine, in particular an Otto engine, and first and second feed lines guiding exhaust gases to the catalytic converter, includes a substantially rotationally symmetrical honeycomb body having first and second passage lines at least approximately gas-tightly closed off relative to each other and a plurality of passages in each passage line connecting intake and outlet ends of the honeycomb body. The first and second feed lines are respectively connected to the first and second passage lines at the intake end. The first passage line is disposed substantially coaxially in the interior of the second passage line and the hydraulic diameters of the first and second passage lines are approximately equal.

12 Claims, 2 Drawing Sheets

CATALYTIC CONVERTER CONFIGURATION AND EXHAUST GAS SYSTEM WITH A CATALYTIC CONVERTER CONFIGURATION

BACKGROUND OF THE INVENTION

FIELD OF THE INVENTION

The invention relates to a catalytic converter configuration for an exhaust gas system of a motor vehicle having an internal combustion engine, such as an Otto engine. The invention also relates to an exhaust gas system with a catalytic converter configuration.

Catalytic converters for the conversion of exhaust gases, which include a honeycomb body having a plurality of passages through which a fluid can flow, are known, for example, from European Patent 0 049 489 B. The honeycomb bodies preferably include sheet metal layers, wherein at least a part of the sheet metal layers is at least partially structured so that the passages are formed between the sheet metal layers.

Furthermore, European Patent 0 245 783 B1 discloses a catalytic converter configuration for exhaust gas systems of motor vehicles, in which the exhaust gas is guided at least in portions of the exhaust gas system in at least two separate exhaust gas lines. Disposed in each exhaust gas line is at least one passage line or passage array of a catalytic converter that has a plurality of passages through which the exhaust gas can flow. The passage lines or passage arrays are disposed in a common casing and are separated from each other by approximately flat separating walls.

Exhaust gas systems are also known to have two or more lines, wherein a respective specific catalytic converter is disposed in each exhaust gas line. Particularly in the case of catalytic converters which are disposed near the engine, the exhaust gases are frequently passed in dual lines to a position beyond the catalytic converter or converters in order to avoid torque losses.

SUMMARY OF THE INVENTION

It is accordingly an object of the invention to provide a catalytic converter configuration and an exhaust gas system with a catalytic converter configuration, which overcome the hereinafore-mentioned disadvantages of the heretofore-known devices of this general type and in which the catalytic converter or converters have the smallest possible external surface area so that heat losses at outside surfaces due to radiant heat dissipation are as low as possible. In addition, the catalytic converter or converters should have the lowest possible thermal capacity in order to reach an ignition temperature at which the catalytic process commences as early as possible in starting phases of the internal combustion engine. Furthermore, a cross-sectional surface area of the catalytic converter or converters, which is available for an exhaust gas flow, should be utilized as well as possible even in edge regions of passage lines or arrays.

With the foregoing and other objects in view there is provided, in accordance with the invention, in a motor vehicle having an internal combustion engine and an exhaust gas system with first and second feed lines guiding exhaust gases during operation, a catalytic converter configuration receiving the exhaust gases from the feed lines, comprising a substantially rotationally symmetrical honeycomb body having an intake end, an outlet end, and first and second passage lines or arrays at least approximately gas-tightly closed off relative to each other; the passage lines each having a multiplicity of passages interconnecting the intake and outlet ends; the first and second passage lines respectively connected to the first and second feed lines at the intake end; the second passage line having an interior, and the first passage line disposed substantially coaxially in the interior; and the first and second passage lines having approximately equal hydraulic diameters.

In such a configuration the external surface areas of the passage lines can be small, the passage lines can have a low thermal capacity and good use can be made of the flow cross-section available for exhaust gas flow.

The term hydraulic diameter is used to denote the diameter of a passage of circular cross-section which, given the same passage length, produces the same pressure drop for a flow.

Various configurations of the catalytic converter configuration are possible using different honeycomb bodies.

In accordance with another feature of the invention, the passages are almost all of approximately the same cross-sectional areas, and the cross-sectional areas of the first and second passage lines are approximately equal.

The rotational symmetry of the honeycomb body results in an advantageous relationship between its external periphery and its cross-sectional area and thus also an advantageous relationship between its external surface area and its volume. Preferably, the external surface is approximately a cylindrical external surface. Since the first passage line is guided in the interior of the second passage line, the heat losses of the first passage line during operation of the catalytic converter configuration are extremely low. It is even possible for the first passage line to receive heat from the second passage line surrounding it, more specifically when the exhaust gases which flow through the second passage line are at a higher temperature than the exhaust gases flowing through the first passage line. Considerable heat losses therefore occur only at the second passage line, by way of the external surface thereof.

Preferred honeycomb bodies are those with good thermal insulation, for example by virtue of the use of a double-wall casing, as is described in German Published, Non-Prosecuted Patent Application DE 44 45 557 A1. Another possible way of providing for good thermal insulation is to provide additional passages at the external periphery of the second passage line, through which exhaust gas cannot flow, for example by applying structured and non-structured sheet metal layers which are wound therearound.

An advantage of the catalytic converter configuration according to the invention is that the thermal capacity in the region of the catalytic converter can be low. Due to the compact configuration of the two passages lines, little material is required in the passage lines for mechanical stabilization of the honeycomb body and for connection of the passage lines of the honeycomb body to the exhaust gas system. A saving in material denotes at the same time a reduction in thermal capacity.

Particularly in the case of laminar exhaust gas flows in the feed lines of previously known catalytic converter configurations, the exhaust gases flow through edge regions at external surfaces of the passages lines more slowly than in inner regions. The catalytic converter configuration according to the invention can counteract that uneven utilization of the available flow cross-section by virtue of the fact that the exhaust gas which flows in the second feed line is compelled to flow to the outer region of the honeycomb body.

In accordance with an added feature of the invention, the honeycomb body has a cylindrical inner tube which is disposed coaxially in the interior of the second passage line and which embraces the first passage line and connects the ends of the honeycomb body together. The cylindrical inner tube has an end which projects out at the intake end of the honeycomb body. It is possible, for example, for connecting portions which connect the passage lines to the feed lines to be welded or sheet metal layered to that end.

In accordance with a further feature of the invention, the end, together with the connecting portion or portions, forms an approximately sealing sliding fit.

In accordance with an additional feature of the invention, the first and the second feed lines, at least in a portion directly upstream of the honeycomb body, pass through a coaxial tube with a cylindrical inner tube and a cylindrical outer tube which is coaxial with respect thereto, and the first feed line passes through the inner tube. A preferred development of this embodiment is a construction in which the diameter of the inner tube and the outer tube are respectively equal to the diameter of the first passage line and the second passage line. The honeycomb body preferably has a tubular casing which contains the two passage lines. The outer tube of the coaxial tube is welded, brazed or flange-connected to the tubular casing.

In accordance with yet another feature of the invention, portions of the first and second feed lines each have a respective first and second conduit portion which are of approximately the same cross-section, the second feed line has a second transitional portion which connects the second conduit portion to the second passage portion in gas-tight relationship relative to the exterior and the first feed line has a first transitional portion which, passing through the wall of the first transitional portion, connects the first conduit portion to the first passage line in gas-tight relationship relative to the exterior and in at least approximately gas-tight relationship with respect to the second feed line.

In accordance with yet a further feature of the invention, the first and second conduit portions are disposed in a common outer tube. An advantage of this development is that the outer tube forms an insulation for the two conduit portions and that the two conduit portions can have thin external walls because the outer tube mechanically stabilizes the conduit portions. In yet a further development, the two conduit portions each have a semicircular cross-section and approximately fill a circular internal cross-section of the outer tube.

In accordance with yet an added feature of the invention, the honeycomb body is a metallic honeycomb body with wound and/or layered sheet metal layers of which at least a portion are structured sheet metal layers so that the passages are formed between the sheet metal layers. Honeycomb bodies of that kind are known, for example, from German Published, Non-Prosecuted Patent Application DE 42 23 134 A1, corresponding generally to U.S. Pat. Nos. 5,464,679 and 5,608,968 and U.S. application Ser. No. 08/761,527, filed Dec. 6, 1996. Honeycomb bodies of that kind are also known from European Patent 0 049 489 B.

There are further embodiments with further forms of connections for the feed lines to the passage lines. The honeycomb body may be slotted in an annular configuration at the intake end and may form an almost sealing sliding fit with the first feed line. In accordance with another possible form of connection, at the intake end the catalytic converter configuration has a cylindrical ring of the same diameter as the first passage line which is connected to the honeycomb body by way of holding elements that project into passages in the honeycomb body.

With the objects of the invention in view there is also provided an exhaust gas system, comprising a four-cylinder, in-line internal combustion engine having first, second, third and fourth cylinders; first and second feed lines guiding exhaust gases from the engine during operation; and a catalytic converter configuration receiving the exhaust gases from the feed lines, the catalytic converter configuration including a substantially rotationally symmetrical honeycomb body having an intake end, an outlet end, and first and second passage lines at least approximately gas-tightly closed off relative to each other, the second passage line connected to the first and fourth cylinders, and the first passage line connected to the second and third cylinders, the passage lines each having a multiplicity of passages interconnecting the intake and outlet ends, the first and second passage lines respectively connected to the first and second feed lines at the intake end, the second passage line having an interior, the first passage line disposed substantially coaxially in the interior, and the first and second passage lines having approximately equal hydraulic diameters.

Due to the edge or boundary situation of cylinders I and IV, the exhaust gases from those cylinders are at a higher temperature than the exhaust gases from cylinders II and III. In order to reach the ignition temperature as early as possible in the start-up phase in both passage lines, the exhaust gases at higher temperature are passed into the second passage line at which substantially higher heat losses occur.

Other features which are considered as characteristic for the invention are set forth in the appended claims.

Although the invention is illustrated and described herein as embodied in a catalytic converter configuration and an exhaust gas system with a catalytic converter configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
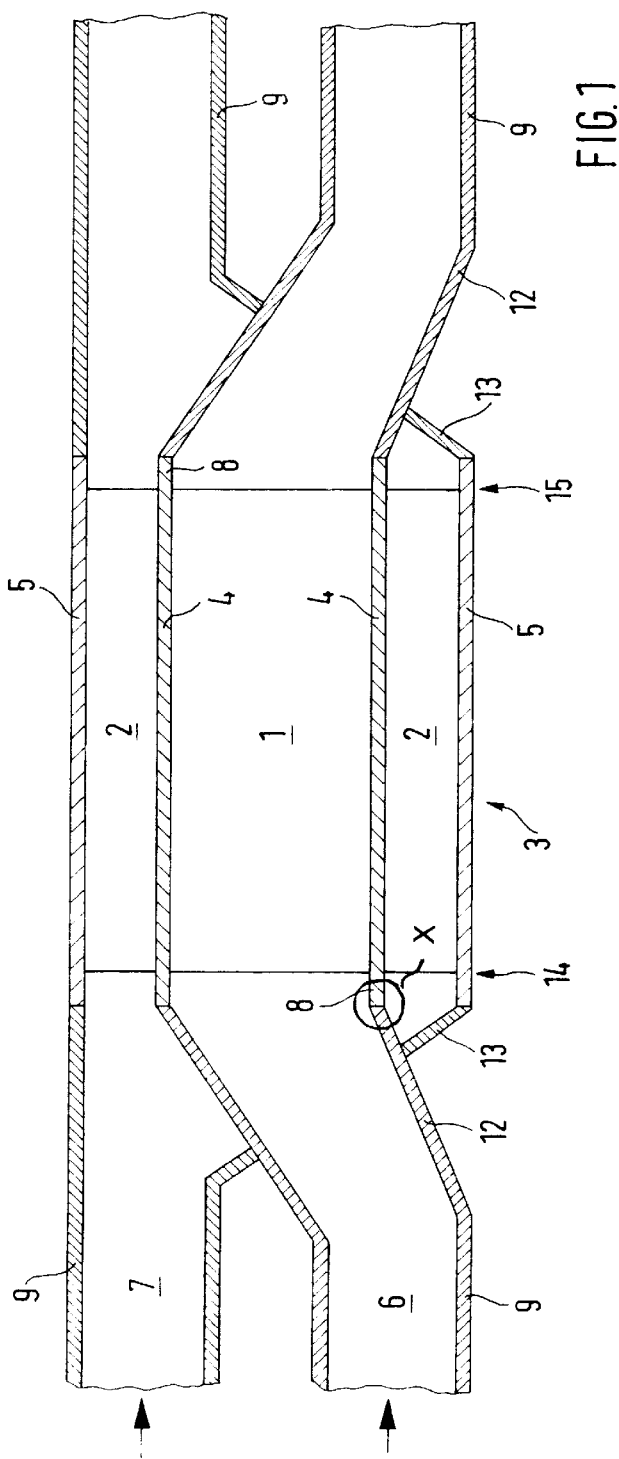
FIG. 1 is a fragmentary, diagrammatic, longitudinal-sectional view of a catalytic converter configuration according to the invention having feed lines with conduit portions which are spatially separated from each other in regard to parts thereof.

Referring now to the figures of the drawings in detail and first, particularly, to FIG. 1 thereof, there is seen a catalytic converter configuration which has an approximately rotationally symmetrical honeycomb body 3 with a cylindrical tubular casing 5 and a cylindrical inner tube 4 that is coaxial with respect thereto. That configuration thus forms a first inner passage line or array 1 and a second outer passage line or array 2. It is seen that the first passage line 1 is disposed substantially coaxially in the interior of the second passage line 2 and that the first and second passage lines 1, 2 have approximately equal hydraulic diameters. An exhaust gas feed and an exhaust gas discharge are symmetrical with respect to the honeycomb body. The left-hand side in FIG. 1 shows an exhaust gas feed with a first feed line 6 and a second feed line 7. The first feed line 6 and the second feed line 7 shown at the left-hand edge in FIG. 1 each have a respective conduit portion 9 which have approximately the same cylindrical cross-section. The conduit portion 9 of the second feed line 7 merges into a second transitional portion 13 which connects the conduit portion 9 to the second passage line 2 in a gas-tight relationship relative to the exterior. The conduit portion 9 of the first feed line 6 merges into a first transitional portion 12 which connects the conduit portion 9 to the first passage line 1 in a gas-tight relationship relative to the exterior as well as in a gas-tight relationship relative to the second feed line. In that configuration the first transitional portion 12 passes through a wall of the second transitional portion 13.

Figure 4:
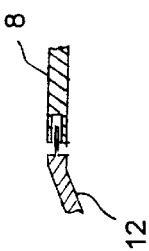
FIG. 4 is a fragmentary, longitudinal-sectional view of a portion X of FIG. 1 showing another embodiment with a sliding fit.

The cylindrical inner tube 4 has an end 8 which projects out of the cylindrical tubular casing 5 of the honeycomb body 3 at an intake end 14. The transitional portion 12 is gas-tightly brazed or welded to and around the end 8. However, it is also possible for the transitional portion 12 and the end 8 to form an approximately gas-tight sliding fit, for example by providing an end portion of the end 8 with an encompassing slot and by providing the transitional portion 12 with a correspondingly shaped annular end which fits into the slot, as is shown in FIG. 4. In that way, play can be allowed for different variations in length of the first and second exhaust gas lines caused by temperature differences. The second transitional portion 13 is preferably welded to the tubular casing 5.

An exhaust gas discharge is connected to an outlet end 15 of the honeycomb body 3 in mirror-symmetry relative to the catalytic converter 3, but otherwise it is like the exhaust gas feed at the intake end 14.

Figure 2:
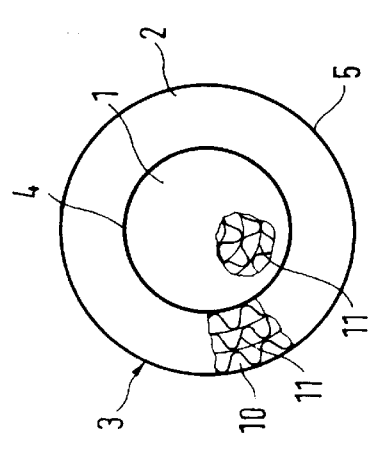
FIG. 2 is a cross-sectional view of the catalytic converter.

The cross-sectional view in FIG. 2 shows the preferred structure of the honeycomb body 3 with wound or coiled and layered sheet metal layers 11, of which approximately half are structured layers so that passages or channels 10 are formed between the layers 11.

Figure 3:
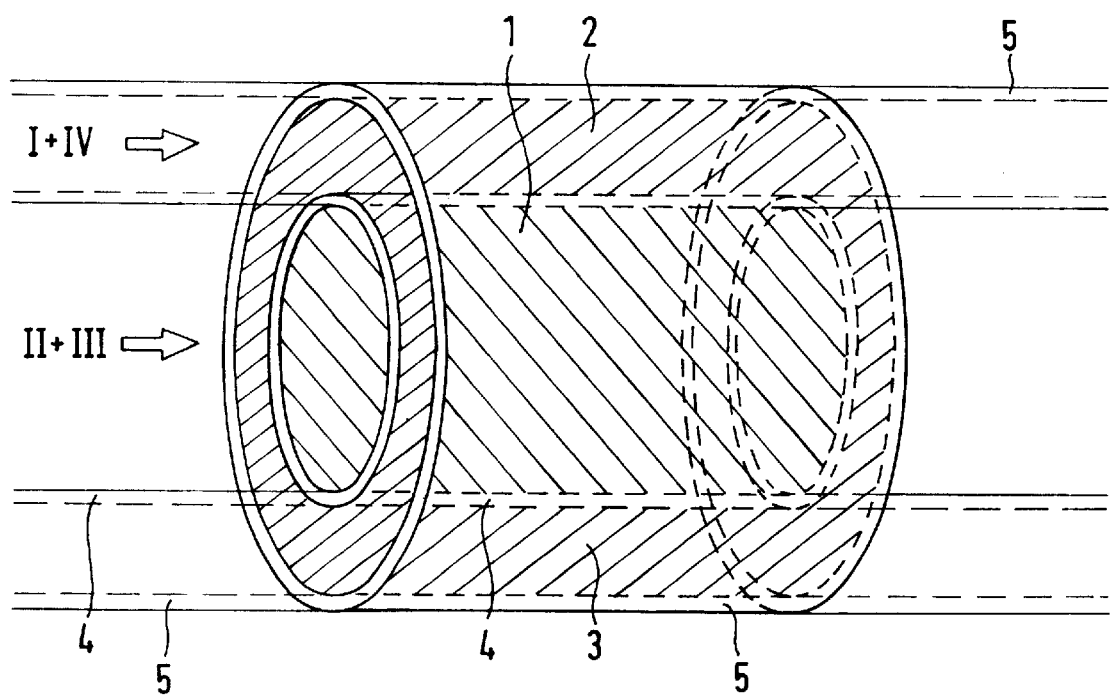
FIG. 3 is a fragmentary, perspective view of a catalytic converter with a coaxial connecting tube.

The honeycomb body 3 shown in FIG. 3 is connected to a coaxial tube or pipe 4, 5 having the cylindrical inner tube 4 and the cylindrical outer tube or tubular casing 5 which is coaxial with respect thereto. The passage lines 1 and 2 of the honeycomb body 3 are connected to cylinders of a four-cylinder in-line engine. The cylinders are successively numbered I through IV. During operation of the internal combustion engine, exhaust gases from cylinders I and IV flow through the outer passage line 2, as is indicated by a designation "I+IV" and by an arrow in FIG. 3. Exhaust gases from cylinders II and III correspondingly flow through the passage line 1 as is indicated by a designation "II+III" and by another arrow in FIG. 3.

A catalytic converter configuration according to the invention, while being of a compact construction, can permit conversion of the exhaust gases at a position close to the engine, with low heat losses due to radiation and with approximately uniform distribution of exhaust gas flows over the cross-section of the honeycomb body.

I claim:

1. In a motor vehicle having an internal combustion engine and an exhaust gas system with first and second feed lines guiding exhaust gases during operation, a catalytic converter configuration receiving the exhaust gases from the feed lines, comprising:

a substantially rotationally symmetrical honeycomb body having an intake end, an outlet end, and first and second passage lines at least approximately gas-tightly closed off relative to each other;

said first and second passage lines each having a multiplicity of passages interconnecting said intake end and said outlet end;

said first and second passage lines respectively connected to first and second feed lines of an exhaust gas system at said intake end and at said outlet end such that the first and second feed lines remain at least approximately gas-tightly closed off relative to each other, the first and second feed lines having respective first and second conduit portions with approximately the same cross-section at said intake end and said outlet end, the second feed line having a second transitional portion connecting the second conduit portion to said second passage line gas-tightly relative to outside the catalytic converter, the first feed line having a first transitional portion passing through a wall of the second transitional portion and connecting the first conduit portion to said first passage line gas-tightly relative to outside the catalytic converter and at least approximately gas-tightly relative to said second feed line; and said second passage line having an interior, and said first passage line disposed substantially coaxially in said interior.

2. The catalytic converter configuration according to claim 1, wherein almost all of said passages of said honeycomb body disposed in one of said passage lines have approximately the same cross-section, and said passage lines have approximately equal cross-sectional areas.

3. The catalytic converter configuration according to claim 1, wherein said honeycomb body is annularly slotted at said intake end and forms a substantially sealing sliding fit with the first feed line.

4. The catalytic converter configuration according to claim 1, wherein said honeycomb body has a cylindrical inner tube disposed coaxially in said interior of said second passage line and surrounding said first passage line, said cylindrical inner tube connecting said ends of said honeycomb body together and having an end at said intake end projecting out of said honeycomb body.

5. The catalytic converter configuration according to claim 1, including a coaxial tube having a cylindrical inner tube and a cylindrical outer tube coaxial with said inner tube, the first and second feed lines having a given portion immediately in front of said honeycomb body and passing through said coaxial tube at least in the given portion, and the first feed line passing through said inner tube.

6. The catalytic converter configuration according to claim 1, wherein the first and second conduit portions form a common outer tube.

7. The catalytic converter configuration according to claim 1, wherein said honeycomb body is a metallic honeycomb body with sheet metal layers, and at least a portion of said sheet metal layers are structured forming said passages between said sheet metal layers.

8. The catalytic converter configuration according to claim 1, wherein said sheet metal layers are wound.

9. The catalytic converter configuration according to claim 1, wherein said sheet metal layers are layered.

10. The catalytic converter configuration according to claim 1, wherein said sheet metal layers are wound and layered.

11. The catalytic converter configuration according to claim 1, wherein said first and second passage lines have approximately equal hydraulic diameters.

12. An exhaust gas system, comprising:
- a four-cylinder, in-line internal combustion engine having first, second, third and fourth cylinders;
- first and second feed lines guiding exhaust gases from said engine during operation; and
- a catalytic converter configuration receiving the exhaust gases from said first and second feed lines, said catalytic converter configuration including a substantially rotationally symmetrical honeycomb body having an intake end, an outlet end, and first and second passage lines at least approximately gas-tightly closed off relative to each other, said second passage line connected to said first and fourth cylinders, said first passage line connected to said second and third cylinders, said first and second passage lines each having a multiplicity of passages interconnecting said intake end and said outlet end, said first and second passage lines respectively connected to said first and second feed lines at said intake end and at said outlet end such that said first and second feed lines remain at least approximately gas-tightly closed off relative to each other, the first and second feed lines having respective first and second conduit portions with approximately the same cross-section at said intake end and said outlet end, the second feed line having a second transitional portion connecting the second conduit portion to said second passage line gas-tightly relative to outside the catalytic converter, the first feed line having a first transitional portion passing through a wall of the second transitional portion and connecting the first conduit portion to said first passage line gas-tightly relative to outside the catalytic converter and at least approximately gas-tightly relative to said second feed line, said second passage line having an interior, said first passage line disposed substantially coaxially in said interior, and said first and second passage lines having approximately equal hydraulic diameters.

* * * * *